United States Patent
Sciascia et al.

(10) Patent No.: US 10,138,121 B2
(45) Date of Patent: Nov. 27, 2018

(54) HYDROGEN DOSAGE IN LED LIGHTING BULBS

(71) Applicant: SAES GETTERS, S.p.A, Lainate (IT)

(72) Inventors: Calogero Sciascia, Piacenza (IT); Alessio Corazza, Como (IT)

(73) Assignee: SAES GETTERS, S.p.A., Lainate MI (IT)

(*) Notice: Subject to any disclaimer, the term of this patent is extended or adjusted under 35 U.S.C. 154(b) by 0 days.

(21) Appl. No.: 15/747,254

(22) PCT Filed: Aug. 1, 2016

(86) PCT No.: PCT/IB2016/054611
§ 371 (c)(1),
(2) Date: Jan. 24, 2018

(87) PCT Pub. No.: WO2017/021862
PCT Pub. Date: Feb. 9, 2017

(65) Prior Publication Data
US 2018/0215614 A1    Aug. 2, 2018

(30) Foreign Application Priority Data

Aug. 4, 2015 (IT) .................. 102015000041842

(51) Int. Cl.
| | | |
|---|---|---|
| *C01B 3/04* | (2006.01) | |
| *F21K 9/90* | (2016.01) | |
| *F21V 29/50* | (2015.01) | |
| *F21Y 115/10* | (2016.01) | |

(52) U.S. Cl.
CPC ............... *C01B 3/04* (2013.01); *F21K 9/90* (2013.01); *F21V 29/50* (2015.01); *F21Y 2115/10* (2016.08)

(58) Field of Classification Search
CPC ... C01B 3/04; F21V 29/50; F21K 9/90; F21Y 2115/15
See application file for complete search history.

(56) References Cited

U.S. PATENT DOCUMENTS

| | | |
|---|---|---|
| 3,940,474 A | 2/1976 | Huskins et al. |
| 8,587,186 B2 | 11/2013 | Hoetzl et al. |
| 2003/0042008 A1 | 3/2003 | Schulz et al. |
| 2013/0141892 A1 | 6/2013 | Okazaki et al. |
| 2014/0312760 A1* | 10/2014 | Augustine ............ F21V 29/004 313/12 |

OTHER PUBLICATIONS

International Search Report and Written Opinion dated Oct. 21, 2016 in PCT/162016/054611 filed Aug. 1, 2016.

* cited by examiner

*Primary Examiner* — David V Bruce
(74) *Attorney, Agent, or Firm* — Oblon, McClelland, Maier & Neustadt, L.L.P.

(57) ABSTRACT

Method for the irreversible dosage of hydrogen in LED light bulbs by means of heating an irreversible hydrogen dispenser containing at least an active material for hydrogen release.

18 Claims, No Drawings

HYDROGEN DOSAGE IN LED LIGHTING BULBS

CROSS-REFERENCE TO RELATED APPLICATIONS

The present application is a 35 U.S.C. § 371 national stage patent application of International patent application PCT/IB2016/054611, filed on Aug. 1, 2016, the text of which is incorporated by reference, and claims the benefit of the filing date of Italian application no. 102015000041842, filed on Aug. 4, 2015, the text of which is also incorporated by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF THE MATERIAL ON THE COMPACT DISC

Not Applicable.

BACKGROUND OF THE INVENTION

Field of the Invention

"Gas filled" Light Emitting Diodes systems or "Gas filled" LED bulbs are proposed as incandescent-replacement lamps and in some cases also as High Intensity Discharge (HID) replacement lamps; these LED bulbs typically consist of LEDs based structures (for example the so called "LED filaments" based on a series of tiny LEDs arranged on narrow and long substrates or LEDs mounted, for example by soldering, on boards) sealed inside glass bulbs filled with a filling gas having high thermal conductivity so that the presence of a specific heat sink is not necessary. More information on this type of lamps can be found in the European patent Nr. EP2535640.

Description of the Related Art Including Information Disclosed under 37 CFR 1.97 and 1.98

The usually adopted gas is the highly thermally conductive helium or filling mixtures with a high concentration of He, and the filling pressure may range from 100 mbar to 1200 mbar, in such a way that during operation LEDs can work at temperatures lower than the critical values (typically it is suggested that the operating temperature is below 125° C. in order to prevent accelerated degradation mechanisms and to avoid an appreciable reduction of the luminous efficacy).

Even though Helium is actually the most diffused gas, also hydrogen has been described as suitable gas, for example in the US patent application 2004/201990. Hydrogen presents some technical advantages in view of its higher thermal conductivity with respect to helium, in addition its lower viscosity makes the convective mechanisms more effective in thermal dissipation and furthermore its lower fugacity reduces the gas loss during the long lamp lifetime but its use creates also a major drawback linked to safety reasons.

BRIEF SUMMARY OF THE INVENTION

The present invention aims at the problem of precise and controlled hydrogen filling within LED light bulb in order to achieve a good thermal management, without the risks associated with the use of a hydrogen gas supply. The precision in the hydrogen dosage assures that the right hydrogen content is present within the LED light bulb, i.e. the amount is sufficient to guarantee a satisfactory thermal management, and at the same time the hydrogen concentration is kept below the hazardous level. This is a problem that may manifest not within normal LED light bulb operation, as the bulb is sealed and therefore isolated from the external environment containing oxygen, but may come into play in case of bulb rupture and therefore contact and mixing of the external atmosphere with the inner atmosphere of the LED light bulb.

The above mentioned advantages are achieved with the present invention, that in a first aspect thereof consists in a method for the irreversible dosage of hydrogen in LED light bulbs comprising a step of heating an irreversible hydrogen dispenser containing at least an active material for hydrogen release, characterized in that said active material for hydrogen release is:

one or more material A selected in the group consisting of $LiH$, $NaH$, $MgH_2$, $CaH_2$, $LiAlH_4$, $LiBH_4$, $NaAlH_4$, their sub-stoichiometric compounds containing at least one third of the hydrogen amount contained in the corresponding stoichiometric compounds, and mixtures thereof; or a mixture between:
one or more material B selected in the group consisting of $TiH_2$, $ZrH_4$, $YH_2$, $ZrCr_{(2-x)}Mn_{(x)}H_2$, $LaNi_{(5-y)}Al_yH_{(6+z)}$, $LaNi_{(5-y)}Sn_yH_{(6+z)}$, and their sub-stoichiometric compounds containing at least one third of the hydrogen amount contained in the corresponding stoichiometric compounds, wherein x is comprised between 0 and 2, y is comprised between 0 and 0.25 and z is comprised between 0 and 0.5; and one or more material C selected in the group consisting of Al, Sn, AlNi, AlSi, CuAl, CuSn; and/or one or more material A;

said active material for hydrogen release being also characterized in that the sum of $W_A$ and $W_B$ is at least 5 mg/dm$^3$ of the LED light bulb volume, and in that the ratio $W_B/(W_A+9*W_C)$ is comprised between 0 and 0.8, more preferably between 0 and 0.6; wherein $W_A$ is the weight of materials A in mg/dm$^3$ of the LED light bulb volume, $W_B$ is the weight of materials B in mg/dm$^3$ of the LED light bulb volume and $W_C$ is the weight of materials C in mg/dm$^3$ of the LED light bulb volume.

As above defined, the term active materials identifies the materials that are involved in the mechanism of hydrogen release, namely A, B and C. Additional elements may be present in the dispenser, that in any case shall satisfy the above limitation on the minimal amounts of A and B, and the weight ratio relationship between $W_B$ and $W_A+9*W_C$.

The sum of $W_A$, $W_B$ and $W_C$ should be lower than 3000 mg/dm$^3$ of the LED light bulb inner volume.

In some embodiments it is preferred the addition/use of getter materials to remove unwanted gases/impurities that may affect the LED light bulb performances such as hydrocarbons and other organic volatile compounds, for example one of such getter material is given by metallic alloys based on the combination of Zr, Fe, V and, in particular the ZrFeV alloy, known with the commercial name St707.

It is to be underlined that the above specified ZrFeV alloy is just a possible example, as any material capable to bind the organic volatile compounds without decomposition by-products is suitable to be used in the hydrogen dispensing method according to the present invention.

The term "irreversible hydrogen dispenser" according to the present invention is intended to mean a hydrogen dispenser that after the hydrogen release may reabsorb only a fraction of the released hydrogen; more specifically after activation by heating of the irreversible hydrogen dispenser in a closed environment, such as a LED light bulb, the pressure measured after cooling down at room temperature is no less than 60% of the peak pressure measured during the irreversible hydrogen dispenser activation.

This effect is achieved by the proper choice of materials or material combinations, that assures such irreversibility, that is of fundamental relevance, either for the correct LED light bulb operation, or to avoid the use of an excessive amount of hydrogen, that could trigger safety concerns.

This solution and technical problem represent an opposite approach with respect to the most commonly used solid hydrogen sources, where instead a high degree of reversibility of the hydrogen releasing materials is sought, as for example for hydrogen storage application, such as the one described in the US patent application number 2003/042008. As already outlined, for the present application is important that at least the majority of the released hydrogen is not re-absorbed, i.e. irreversibly released.

In the present invention a certain quota of hydrogen re-absorption is tolerated, as the hydrogen within the LED bulb has the function of improving the thermal management of the LED bulb, with reference to heat dissipation; therefore a minority hydrogen reabsorption at lower temperature is acceptable, as further heating due to LED bulb operation will cause its re-emission.

Notwithstanding the above considerations on the tolerable level of hydrogen partial reabsorption by the irreversible hydrogen dispenser, in a preferred embodiment the hydrogen dispenser present an irreversibility equal or higher than 90%. This condition will assure that all the required hydrogen is released and exploited and will also enable a better control of the gaseous environment in terms of gas composition as well as gaseous pressure within the LED light bulb. As previously defined, irreversibility equal or higher than 90% means that, after the first irreversible hydrogen dispenser activation, the Hydrogen partial pressure within the LED lighting bulb fluctuates at most by 10% (typically decreases when the bulb is cold).

Also highly irreversible hydrogen dispenser are the correct type of solution when the dispenser itself is not contained or will not remain within the LED light bulb, for example when hydrogen is inserted in the LED light bulb by means of the so called Tip-Off technique. This technique is widely known and used in the past for mercury dosing within fluorescent lamp, but is applicable for dosing/releasing any kind of gaseous filler within a lamp; other details may be found for example in the article by Corazza et al, "Beneficial effects of using getter during cold cathode lamp production", published in Light Sources 2004 Proceedings of the 10$^{th}$ International Symposium on the Science and Technology of Light Sources.

BRIEF DESCRIPTION OF THE SEVERAL VIEWS OF THE DRAWINGS

Not Applicable.

DETAILED DESCRIPTION OF THE INVENTION

The inventors have found that an irreversible hydrogen generation according to the previous definition is obtained by using one or more materials A selected in the group consisting of LiH, NaH, $MgH_2$, $CaH_2$, $LiAlH_4$, $LiBH_4$, $NaAlH_4$ or mixtures thereof as hydrogen dispenser. These materials can be used standalone, i.e. without the need of additional material for hydrogen management. It is important to underline that the above list encompasses also their sub-stoichiometric compounds, provided that they contain at least one third of the hydrogen amount present in the corresponding stoichiometric compounds (e.g. $CaH_{2/3}$ for the corresponding $CaH_2$).

In the present specification and in the claims, the term "sub-stoichiometric compound" of a material A or B indicates a chemical compound whose elemental composition differs from the composition of the corresponding material A or B in that a certain amount of hydrogen atoms is missing.

Other suitable materials for hydrogen release are given by one or more material B selected in the group consisting of $TiH_2$, $ZrH_4$, $YH_2$, $ZrCr_{(2-x)}Mn_{(x)}H_2$ wherein x is comprised between 0 and 2, $LaNi_{(5-y)}Al_yH_{(6+z)}$, $LaNi_{(5-y)}Sn_yH_{(6+z)}$ wherein y is between 0 and 0.25 and z between 0 and 0.5 and their sub-stoichiometric compounds provided that they contain at least one third of the hydrogen amount present in the corresponding stoichiometric compounds. However, these materials need to be used in combination with one or more material C selected in the group consisting of Al, Sn, AlNi, AlSi, CuAl, CuSn and/or one or more material A.

In particular the inventors have found the conditions for making an irreversible dosage within a LED light bulb, i.e. the use of a dispenser containing one or more material A, or a combination between B and one or more materials A and/or C, that acts as inhibitor.

The above expressed condition for the weight ratio between B, A and C, in particular:

$$W_{ratio}=W_B/(W_A+9*W_C)<0.8$$

reflects the different inhibitor effect by the elements A and C over B. Preferred $W_{ratio}$ interval is between 0 and 0.6.

This condition defines in a manner sufficiently clear for a person skilled in the art the compositions within the irreversible dispenser, that together with the minimal amount of material per LED bulb volume, completely characterize the method according to the present invention.

In particular the most interesting embodiments are hereinafter disclosed:

a) an irreversible hydrogen dispenser containing only A, $W_B=W_C=0$ ($W_{ratio}=0$), wherein the amount of A is in the range of 5-120 mg/dm$^3$, more preferably between 15 and 75 mg/dm$^3$ of the LED light bulb volume;

b) an irreversible hydrogen dispenser containing only A and B; $W_C=0$; in this case A should account for no less than 60 wt % of the composition, and the total amount of A+B is in the range 5-170 mg/dm$^3$ of the LED light bulb volume, more preferably between 20 and 80 mg/dm$^3$ of the LED light bulb volume;

c) an irreversible hydrogen dispenser containing only B and C, $W_A=0$, in this case the inventors have found that such composition shall contain no less than 12.5 wt % of C ($W_{ratio}=0.77$), preferably at least 16% of C ($W_{ratio}=0.58$). In this case the amount of B should be in the range 35-750 mg/dm$^3$, more preferably between 50 and 250 mg/dm$^3$ of the LED light bulb volume.

Preferred materials for the embodiment (a) are $LiAlH_2$ and $MgH_2$, while for embodiment (c) B is preferably chosen from one or more of $TiH_2$ and $ZrCr_{(2-x)}Mn_{(x)}H_2$ with x comprised between 0 and 2, while C is preferably chosen from one or more of CuAl, CuSn and Sn.

With the above specification in term of hydrogen loading for active materials, including the sub-stoichiometric compounds (being at least ⅓ of the stoichiometric correspondent) and weight relationship A, B and C, the irreversible hydrogen dispenser has a $H_2$ concentration in the range 0.060-2.3 mBar·Liter/mg of active material.

As already mentioned, in order to carry out the method according to the present invention the irreversible dispenser may be used outside the led bulb, during its manufacturing stage, or alternatively may be within the lamp. In both cases, the method is not limited to any particular shape, form appearance, placement (this latter relevant only for resident dispensers). In particular the dispenser may be a container, such as for example ring or cup, holding the materials in form of compressed powders. Suitable containers are described for example in the international patent application WO 98/53479, in the European patent EP2408942, U.S. Pat. No. 5,520,560 all in the applicant's name, or in form of compressed powders or pills, or in form of powder dispersion in a suitable binder or matrix. For all the embodiment in which the active material is in form of powder, the granulometry (i.e. for spherical particles the diameter, for irregular particles their maximum size), does not relevantly influence the performances of the dispenser, as long as it fulfills the requirement of being less than 200 μm.

Suitable heating methods to carry out the method according to the present invention are for example RF inductive coupling, IR irradiation (by a lamp or a laser), oven, Joule effect.

Suitable temperature are comprised between 120° C. and 800° C. for times comprised between 10 s and 15 minutes. This wide variability takes into account the differences in the type and materials of LED light bulbs, as some of them may suffer prolonged heating, while others have limits on the upper temperatures. For instance, $MgH_2$ is effectively activated at 400° C., but at temperatures of 600° C. evaporation from the metal is observed. In general shorter duration are coupled with higher temperatures and vice versa.

In some specific embodiments, the irreversible hydrogen dispenser is activated directly by the heating occurring during normal operation of the LED light bulb, this evidently is applicable only for dispenser resident within the LED light bulb, and preferably placed nearby the LEDs, that are the heating sources within the LED bulb.

The pressure of $H_2$ during the LED light bulb operation should be higher than 5 mBar and lower than 250 mBar in the bulb and preferably higher than 10 mBar and lower than 50 mBar. In fact at pressures below 10 mBar the thermal dissipation appears to be in the "molecular-regime", e.g. it is pressure dependent and decreases with decreasing pressures. At pressures above 50 mBar safety concerns may arise because of the high concentration with respect atmospheric oxygen, thus the range between 10 and 50 mBar is the correct trade-off between safety and performances.

It is important to remark that with a method according to the present invention is possible to set the desired and correct quantity of hydrogen within a lamp bulb, that is advantageously comprised between 0.8 and 75 mBar·Liter.

In other words, by using the materials A, and/or B and/or C in the amounts and ratio indicated in the present specification and in the claims, the resulting pressure in the LED lamp during its normal operation, that in the most common LED lamps configurations corresponds to a temperature ranging from 40° C. and 120° C. (depending from the proximity to the LED emitters), will be in the range of 10 mBar to 50 mBar, constantly kept in such range.

It is important to remark that although the present invention is devoted to a method of hydrogen dosing within LED bulbs as such, this does not prevent to adopt the method herein described to obtain more complex inner atmosphere compositions, such as the gaseous mixtures described in the U.S. Pat. No. 8,587,186. In a further aspect thereof the invention is inherent to a light LED bulb containing an irreversible hydrogen dispenser containing at least an active material for hydrogen release characterized in that said material is:
one or more material A selected in the group consisting of LiH, NaH, $MgH_2$, $CaH_2$, $LiAlH_4$, $LiBH_4$, $NaAlH_4$, their sub-stoichiometric compounds containing at least one third of the hydrogen amount contained in the corresponding stoichiometric compounds, and mixtures thereof; or
a mixture between:
one or more material B selected in the group consisting of $TiH_2$, $ZrH_4$, $YH_2$, $ZrCr_{(2-x)}Mn_{(x)}H_2$, $LaNi_{(5-y)}Al_yH_{(6+z)}$, $LaNi_{(5-y)}Sn_yH_{(6+z)}$, and their sub-stoichiometric compounds containing at least one third of the hydrogen amount contained in the corresponding stoichiometric compounds, wherein x is comprised between 0 and 2, y is comprised between 0 and 0.25 and z is comprised between 0 and 0.5; and
one or more material C selected in the group consisting of Al, Sn, AlNi, AlSi, CuAl, CuSn; and/or one or more material A;
characterized in that the sum of $W_A+W_B$ is at least 5 mg/dm³ of the LED light bulb volume, and in that the ratio $W_B/(W_A+9*W_C)$ is comprised between 0 and 0.8, more preferably between 0 and 0.6; wherein $W_A$ is the weight of materials A in mg/dm³ of the LED light bulb volume, $W_B$ is the weight of materials B in mg/dm³ of the LED light bulb volume and $W_C$ is the weight of materials C in mg/dm³ of the LED light bulb volume.

There are three preferred embodiments of LED light bulbs according to the present invention and those are related to the form of the irreversible hydrogen dispenser therein contained:
a) the irreversible hydrogen dispenser is in form of a metallic container holding compressed powders of active material for hydrogen release,
b) the irreversible hydrogen dispenser is in form of compressed powders of the active material for hydrogen release,
c) the irreversible hydrogen dispenser is in the form of a dispersion of active material powders for hydrogen release dispersed in a suitable binder/hosting matrix.
With regards to the third preferred embodiment (c) preferred hosting matrixes are: epoxy or silicone based ones among organic matrixes; alternatively copper or steel pressed powders among metallic matrixes.

The invention will be further illustrated with the help of the following non-limiting examples.

EXAMPLE 1

S1 [$W_A$=100% wt, $W_B$=0, $W_C$=0% wt]

A dispenser for a hydrogen dosing method according to the present invention was prepared by using a material from the list A and specifically only the compound $LiAlH_4$; the powder, about 20 mg, was pressed in a suitable metallic annular container, such as the one described in the afore mentioned U.S. Pat. No. 5,520,560 (FIG. 2 embodiment), and the sample was heated in an evacuated and sealed glass bulb with a volume of about 0.6 dm³ at 250° C. for about 30 minutes. The values of the hydrogen peak pressure induced during the activation and the final pressure after cooling of the sample were measured and are reported in table 1.

EXAMPLE 2

S2 [$W_A$=0% wt; $W_B$=80% wt, $W_C$=20% wt]

A dispenser for a hydrogen dosing method according to the present invention was prepared by mixing a material from the list B, specifically the compound TiH$_2$, and a material from the list C, specifically the alloy CuAl, respectively with a weight ratio 80:20; so the parameter $W_{ratio}$ is =0.44; about 100 mg of this powder were pressed in an annular container and the sample was heated in an evacuated and sealed glass bulb with a volume of about 0.6 dm³ at 600° C. for about 30 seconds. The values of the hydrogen peak pressure induced during the activation and the final pressure after cooling of the sample were measured and reported in table 1.

EXAMPLE 3

S3 [$W_A$=0% wt; $W_B$=50% wt, $W_C$=50% wt]

A dispenser for a hydrogen dosing method according to the present invention was prepared by mixing a material from the list B, the compound TiH$_2$ and a material from the list C, specifically the alloy CuSn, respectively with a weight ratio 50:50; so the parameter $W_{ratio}$ is =0.11; about 100 mg of this powder were pressed in an annular container and the sample was heated in an evacuated and sealed glass bulb with a volume of about 0.6 dm³ at 700° C. for about 30 seconds. The values of the hydrogen peak pressure induced during the activation and the final pressure after cooling of the sample were measured and reported in table 1.

EXAMPLE 4

S4 [$W_A$=70% wt; $W_B$=30% wt; $W_C$=0% wt]

A dispenser for a hydrogen dosing method according to the present invention was prepared by mixing a material from the list A, specifically the compound MgH$_2$, and a material from the list B, specifically the alloy ZrMn$_2$H$_2$, respectively with a weight ratio 70:30; so the parameter $W_{ratio}$ is =0.26; about 12 mg of this powder were pressed in an annular container and the sample was heated in an evacuated and sealed glass bulb with a volume of about 0.6 dm³ at 400° C. for about 300 seconds. The values of the hydrogen peak pressure induced during the activation and the final pressure after cooling of the sample were measured and reported in table 1

COMPARATIVE EXAMPLE 1

C1 [$W_A$=0% wt; $W_B$=90% wt; $W_C$=10% wt]

A dispenser for a hydrogen dosing method not according to the present invention was prepared by mixing a material from the list B, specifically the compound TiH$_2$, and a material from the list C, specifically the alloy CuAl, respectively with a weight ratio 90:10; so the parameter $W_{ratio}$ is =1; about 100 mg of this powder were pressed in an annular container and the sample was heated in an evacuated and sealed glass bulb with a volume of about 0.6 dm³ at 600° C. for about 30 seconds. The values of the hydrogen peak pressure induced during the activation and the final pressure after cooling of the sample were measured and reported in table 1

COMPARATIVE EXAMPLE 2

C2 [$W_A$=40% wt; $W_B$=60% wt; $W_C$=0% wt]

A dispenser for a hydrogen dosing method not according to the present invention was prepared by mixing a material from the list A, specifically the compound CaH$_2$, and a material from the list B, specifically the compound TiH$_2$, respectively with a weight ratio 40:60; so the parameter $W_{ratio}$ is =1.5; about 100 mg of this powder were pressed in an annular container and the sample was heated in an evacuated and sealed glass bulb with a volume of about 0.6 dm³ at 500° C. for about 60 seconds. The values of the hydrogen peak pressure induced during the activation and the final pressure after cooling of the sample were measured and reported in table 1.

TABLE 1

Comparison of peak and final pressure from different H$_2$ dispensers

| Sample ID | H$_2$ Peak pressure (mbar) | Final H$_2$ pressure (mbar) | Percentage of Final H$_2$ pressure (%) |
|---|---|---|---|
| S1 | 31.52 | 30.99 | 98.3 |
| S2 | 41.89 | 26.33 | 62.9 |
| S3 | 29.26 | 27.95 | 95.5 |
| S4 | 94.27 | 92.41 | 98.0 |
| C1 | 46.28 | 8.91 | 19.2 |
| C2 | 5.82 | 0.91 | 15.6 |

As shown in table 1 only using the method according to the invention (using samples S1, S2, S3 and S4) it is possible to create the needed irreversible hydrogen dispensers that reabsorb only a fraction of the released hydrogen after activation and leave in the bulb no less than 60% of the peak pressure obtained during the irreversible hydrogen dispenser activation. Instead the data obtained with comparative sample C1 and C2 show that the hydrogen reabsorption is too high and outside the useful range for the purposes and scopes of the present invention.

The invention claimed is:
1. A method for irreversible generation and dosage of hydrogen in a LED light bulb, the method comprising:
heating an irreversible hydrogen dispenser comprising an active material for hydrogen release, wherein said active material for hydrogen release is:
at least one material A selected from the group consisting of LiH, NaH, MgH$_2$, CaH$_2$, LiAlH$_4$, LiBH$_4$, NaAlH$_4$, their sub-stoichiometric compounds comprising at least one third of the hydrogen amount comprised in the corresponding stoichiometric compounds, and mixtures thereof; or
a mixture between:
at least one material B selected from the group consisting of TiH$_2$, ZrH$_4$, YH$_2$, ZrCr$_{(2-x)}$Mn$_{(x)}$H$_2$, LaNi$_{(5-y)}$Al$_y$H$_{(6+z)}$, LaNi$_{(5-y)}$Sn$_y$H$_{(6+z)}$, and their sub-stoichiometric compounds comprising at least one third of the hydrogen amount comprised in the corresponding stoichiometric compounds, wherein x is comprised between 0 and 2, y is comprised between 0 and 0.25, and z is comprised between 0 and 0.5; and at least one material selected from the group consisting of material A and material C, wherein material C is at least one selected from the group consisting of Al, Sn, AlNi, AlSi, CuAl, and CuSn, wherein a sum of $W_A+W_B$ is at least 5 mg/dm³ of the LED light bulb volume and a ratio $W_B/(W_A+9*W_C)$ is comprised between 0 and 0.8, where $W_A$ is a weight of materials A in mg/dm³ of the LED light bulb volume, $W_B$ is a weight of materials B in mg/dm³ of the LED light bulb volume, and $W_C$ is a weight of materials C in mg/dm³ of the LED light bulb volume.

2. The method according to claim 1, wherein:
$W_B$ and $W_C$ are zero; and
$W_A$ is in the range from 5 to 120 mg/dm³ of the LED light bulb volume.

3. The method according to claim 2, wherein the material A is at least one selected from the group consisting of LiAlH₄ and MgH₂.

4. The method according to claim 1, wherein:
$W_C$ is zero;
$W_B$ is up to 40 wt % of the sum of $W_A$ and $W_B$; and
the sum of $W_A+W_B$ is in the range from 6 to 170 mg/dm³ of the LED light bulb volume.

5. The method according to claim 1, wherein:
$W_A$ is zero;
$W_C$ is at least 15 wt % of a sum of $W_C+W_B$; and
$W_B$ is in the range from 35 to 750 mg/dm³ of the LED light bulb volume.

6. The method according to claim 5, wherein:
the material B is at least one selected from the group consisting of TiH₂ and $ZrCr_{(2-x)}Mn_{(x)}H_2$, where x is comprised between 0 and 2; and
the material C is at least one selected from the group consisting of CuAl, CuSn, and Sn.

7. The method according to claim 1, further comprising:
positioning said irreversible hydrogen dispenser within the LED light bulb.

8. The method according to claim 1, further comprising:
temporarily connecting said irreversible hydrogen dispenser to the LED light bulb during activation.

9. The method according to claim 1, wherein said heating is carried out via RF inductive coupling, IR irradiation, oven, or Joule effect.

10. The method according to claim 1, wherein the heating temperature is comprised between 120° C. and 800° C., and the heating duration is comprised between 10 seconds and 15 minutes.

11. The method according to claim 7, wherein said irreversible hydrogen dispenser releases hydrogen during the LED light bulb normal operation as effect of LED light bulb self-heating.

12. The method according to claim 1, wherein an amount of hydrogen dispensed within the LED light bulb is comprised between 0.8 and 75 mBar·Liter.

13. The method according to claim 1, wherein a hydrogen pressure within the LED light bulb is comprised between 5 mBar and 250 mBar.

14. The method according to claim 1, wherein the irreversible hydrogen dispenser has an H₂ concentration in the range from 0.060 to 2.3 mBar·Liter/mg of active material.

15. An LED light bulb, comprising:
an irreversible hydrogen dispenser comprising an active material for hydrogen release, wherein said active material for hydrogen release is:
at least one material A selected from the group consisting of LiH, NaH, MgH₂, CaH₂, LiAlH₄, LiBH₄, NaAlH₄, their sub-stoichiometric compounds comprising at least one third of the hydrogen amount comprised in the corresponding stoichiometric compounds, and mixtures thereof; or
a mixture between:
at least one material B selected from the group consisting of TiH₂, ZrH₄, YH₂, $ZrCr_{(2-x)}Mn_{(x)}H_2$, $LaNi_{(5-y)}Al_yH_{(6+z)}$, $LaNi_{(5-y)}Sn_yH_{(6+z)}$, and their sub-stoichiometric compounds comprising at least one third of the hydrogen amount comprised in the corresponding stoichiometric compounds, wherein x is comprised between 0 and 2, y is comprised between 0 and 0.25 and z is comprised between 0 and 0.5; and
at least one material selected from the group consisting of material A and material C, wherein material C is at least one selected from the group consisting of Al, Sn, AlNi, AlSi, CuAl, and CuSn, wherein a sum of $W_A+W_B$ is at least 5 mg/dm³ of the LED light bulb volume and a ratio $W_B/(W_A+9*W_C)$ is comprised between 0 and 0.8, where $W_A$ is a weight of materials A in mg/dm³ of the LED light bulb volume, $W_B$ is a weight of materials B in mg/dm³ of the LED light bulb volume, and $W_C$ is a weight of materials C in mg/dm³ of the LED light bulb volume.

16. The LED light bulb according to claim 15, wherein the hydrogen dispenser is in the form of a metallic container holding compressed powders of the active material for hydrogen release.

17. The LED light bulb according to claim 15, wherein the hydrogen dispenser is in the form of pills of compressed powders of the active material for hydrogen release.

18. The LED light bulb according to claim 15, wherein the hydrogen dispenser is in the form of active materials powders for hydrogen release dispersed in a binder or in a hosting matrix.

* * * * *